United States Patent [19]

Kobelt

[11] Patent Number: 4,903,801
[45] Date of Patent: Feb. 27, 1990

[54] SEGMENTED BRAKE DISC

[76] Inventor: Jacob Kobelt, 6110 Oak Street, Vancouver, British Columbia, Canada, V6M 2W2

[21] Appl. No.: 208,796

[22] Filed: Jun. 20, 1988

Related U.S. Application Data

[63] Continuation of Ser. No. 8,746, Jan. 30, 1987, abandoned.

[51] Int. Cl.$^4$ ............................................. F16D 65/12
[52] U.S. Cl. .......................... 188/218 XL; 188/71.6; 188/73.31; 188/264 AA; 192/113 R
[58] Field of Search ..................... 188/71.4, 71.6, 73.1, 188/73.2, 73.31, 218 XL, 250 E, 264 A, 264 AA, 264 D; 192/107 R, 113 R, 70.13

[56] References Cited

U.S. PATENT DOCUMENTS

| | | | |
|---|---|---|---|
| 1,879,744 | 9/1932 | Heiney | 192/107 R |
| 2,107,954 | 2/1938 | Morton et al. | 192/107 R |
| 2,208,525 | 7/1940 | Eksergian | 188/218 XL |
| 2,368,985 | 2/1945 | Heater | 188/264 A |
| 3,422,936 | 1/1969 | Marcheron | 188/218 XL |
| 3,452,844 | 7/1969 | Lallemant | 192/107 R |
| 4,132,294 | 1/1979 | Poli | 188/218 XL |
| 4,164,993 | 8/1979 | Kobelt | 188/218 XL |
| 4,177,883 | 12/1979 | Margetts | 188/218 XL |
| 4,260,047 | 4/1981 | Nels | 192/107 R |
| 4,286,694 | 9/1981 | Wiseman et al. | 188/264 AA |
| 4,396,100 | 8/1983 | Eltze | 192/107 R |
| 4,679,665 | 7/1987 | Smith | 188/218 XL |

FOREIGN PATENT DOCUMENTS

| | | | |
|---|---|---|---|
| 0216534 | 4/1987 | European Pat. Off. | 188/218 XL |
| 2030242 | 4/1980 | United Kingdom | 192/107 R |
| 2128695 | 5/1984 | United Kingdom | 188/218 XL |

Primary Examiner—Robert J. Oberleitner
Assistant Examiner—Mark T. Le
Attorney, Agent, or Firm—Shlesinger & Myers

[57] ABSTRACT

An internally air cooled brake disc assembly of the invention is manufactured by casting in small pieces to eliminate problems associated with casting large discs with integral air cooling passages. The assembly has a main disc member and a plurality of disc segments secured to the main disc member. The disc segments are separate entities and can expand and contract independently of each other, thus reducing distortion from thermal effects. Assembled outer surfaces of each disc segment are generally flat and provide an annular surface to be swept by brake pads. Inner surface of each disc segment has a plurality of ridges and at least one groove which spaces apart the ridges. The ridges contact the main disc member so that at least one passage is formed between the disc segment and the disc member to receive a flow of cooling air. When the disc segments are secured on each side of the main disc member, the disc assembly has a plurality of cooling passages on each side of the main disc member. An optional external fan means can be provided adjacent inner ends of each disc segment to provide a forced flow of air over the outer surfaces of the disc.

17 Claims, 3 Drawing Sheets

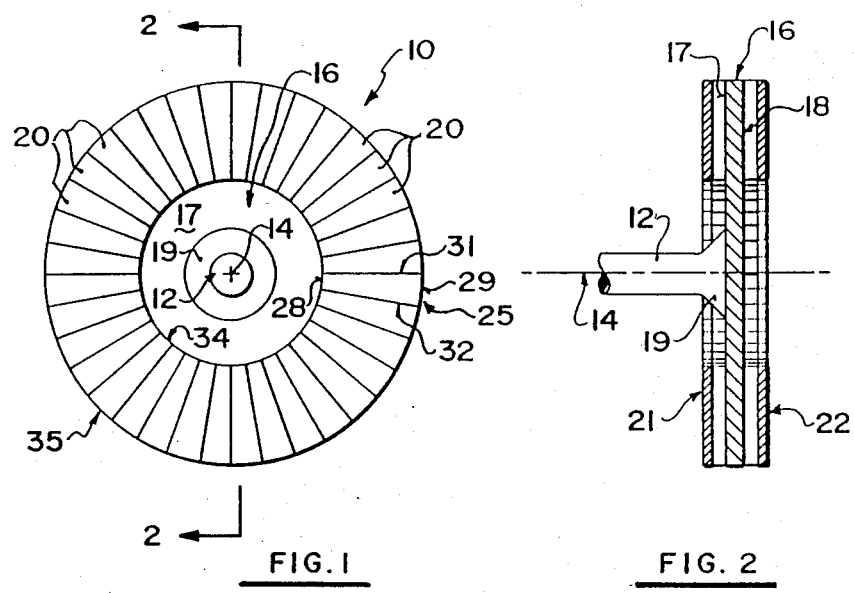
FIG. 1
FIG. 2
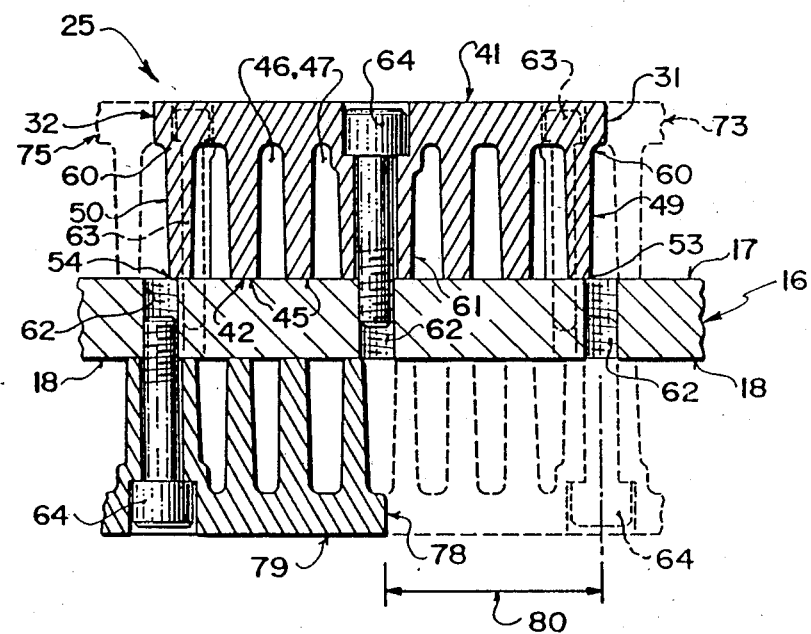
FIG. 4

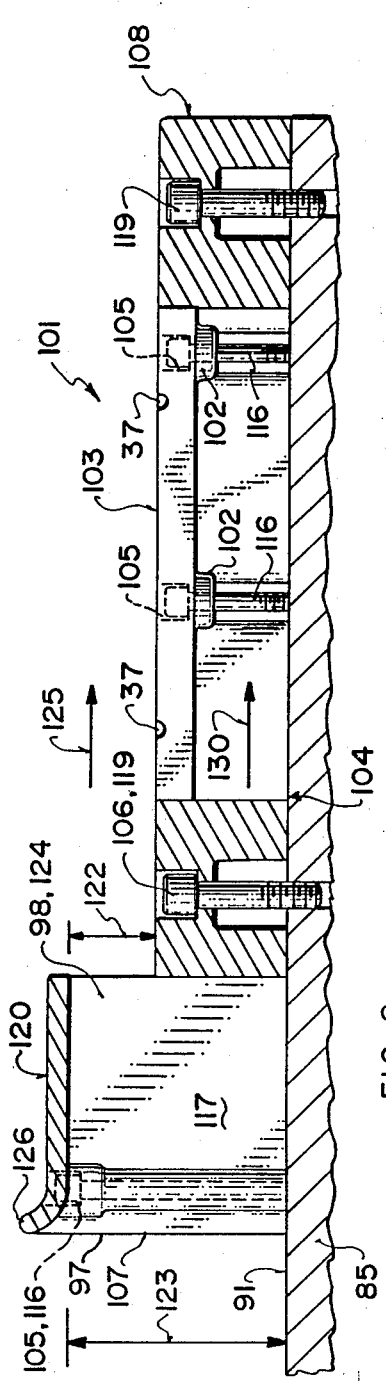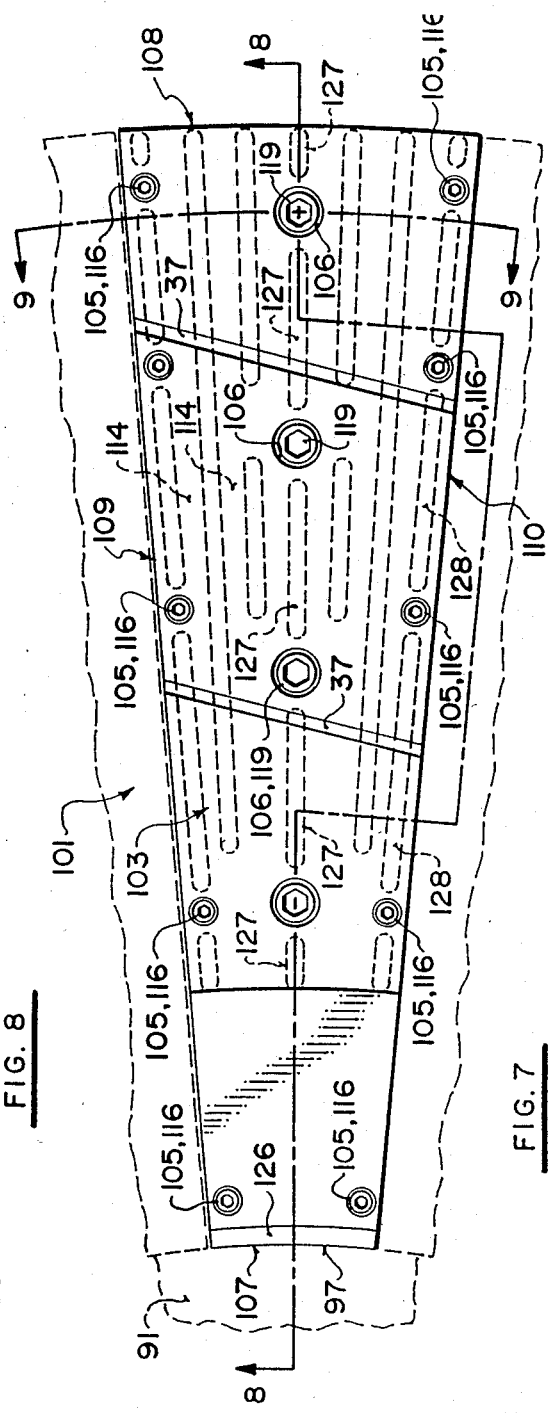

SEGMENTED BRAKE DISC

This application is a continuation of application Ser. No. 008,746, abandoned filed 1/30/87.

BACKGROUND OF THE INVENTION

The invention relates to a brake disc assembly particularly for large industrial brake discs having air cooling passages.

Large industrial brake discs, that is brake discs that exceed 0.5 meters in diameter and are capable of absorbing large amounts of power, are commonly provided with air cooling passages. The air cooling passages extend radially from an inlet generally adjacent the center of the disc to an outlet adjacent a periphery of the disc. The passages pass between surfaces of the disc that are to be swept by brake shoes. As the disc rotates, air is sucked into the inlet, and discharged from the periphery somewhat in the manner of a centrifugal pump. Air passing through the passages between the surfaces removes heat generated during braking. Temperature variations across the disc produce inequal expansion and contraction, which can cause serious distortion of the disc and consequent erratic braking.

Commonly, discs of this size are manufactured by sand casting as a single piece, using expendable cores to produce the air cooling passages within the disc. Difficulties can be encountered when casting large discs, particularly to produce a sound casting without "cold-shuts" or "mis-runs" in relatively thin internal webs or walls between the air cooling passages. Large discs of this type can also be difficult to cast and concurrently maintain material integrity, in which the material is free of mold inclusions and oxide inclusions, which is necessary for discs which rotate at high speeds and absorb large amounts of horsepower. The rough-cast disc is machined to produce smooth annular braking surfaces on each side of the disc. The cost of manufacturing such discs can be quite high due to the high scrap rates, and salvaging costs of poorly cast discs. If a portion of the one-piece cast disc cannot be salvaged, the whole disc is rejected, thus increasing manufacturing costs.

SUMMARY OF THE INVENTION

The invention reduces the difficulties and disadvantages of the prior art by providing a brake disc assembly which uses a combination of a main steel disc produced by a high quality controlled process, eg., from a rolling mill, and a plurality of relatively small, preferably die-cast, components which are secured to the steel disc. Because the steel disc is produced under controlled conditions, it has high material integrity when compared with a sand-cast disc. The small die-cast components have a higher material integrity than large sand-cast components, and, due to close tolerances that can be obtained when die-casting, require less machining than equivalent sand-cast parts. The die cast components are sufficiently small to permit production in a conventional die casting machine. The smaller cast components can expand and contract individually relative to each other, thus reducing thermal stresses and distortion when compared with a one-piece disc. Furthermore, if a few of the small cast components are damaged during operation of the disc, the few damaged components can be replaced with servicable components, without requiring a major salvage or complete scrapping of the disc.

A brake disc assembly according to the invention has a main disc member and a plurality of separate disc segments. The main disc member is adapted for rotation about a disc axis and has first and second main surfaces disposed normally to the disc axis. The main disc also has a plurality of openings. The disc segments are releasably secured to the main disc member, and each disc segment has inner and outer surfaces and a plurality of parallel openings passing between the surfaces to register with corresponding openings in the main disc. The surfaces have, and are defined by, inner and outer edges and first and second interconnecting edges which interconnect the inner and outer edges. The outer surface of each segment is flat and disposed parallel to the main surfaces of the disc, and the inner surface has a plurality of ridges and at least one groove. The ridges are spaced apart by the groove, and at least two of the ridges contact one of the main surfaces of the main disc member so that the groove cooperates with the main surface to form at least one passage between the disc segment and the disc member. Each interconnecting edge of one disc segment cooperates with an adjacent interconnecting edge of an adjacent disc segment. The assembly includes a plurality of replaceable fasteners passing through registered openings in the disc segments and the main disc to releasably secure the disc segments to the main disc. so that the outer surfaces of the disc segments secured to a particular main face of the disc member are co-planar with each other and form a generally flat braking surface disposed normally to the disc axis and are adapted to be swept by a brake pad.

In one embodiment, an external fan element is provided adjacent a portion of each disc segment closest to the disc axis, so that the fan element is adapted to cooperate with similar fan elements to provide an external fan means to direct a flow of air across the outer surfaces of the disc segments as the disc rotates, thus augmenting cooling.

A detailed disclosure following, related to drawings, describes preferred embodiments of the invention, which is capable of expression in structure other than that particularly described and illustrated.

DESCRIPTION OF THE DRAWINGS

FIG. 1 is a simplified front elevation of a brake disc assembly according to the invention, as viewed along an axis of a brake shaft, FIG. 2 is a simplified, partly-sectioned, side elevation of the brake disc assembly, as seen from line 2—2 of FIG. 1, FIG. 4 is a simplified fragmented section as seen on arcuate line 4—4 of FIG. 3, looking inwardly towards the axis, FIG. 7 is a simplified front elevation of a disc segment of the assembly of FIG. 5, portions of adjacent disc segments being shown on each side of the disc segment, FIG. 8 is a simplified fragmented section on line 8—8 of FIG. 7, showing a portion of external fan means.

DETAILED DISCLOSURE

FIGS. 1 and 2

Figure 3:
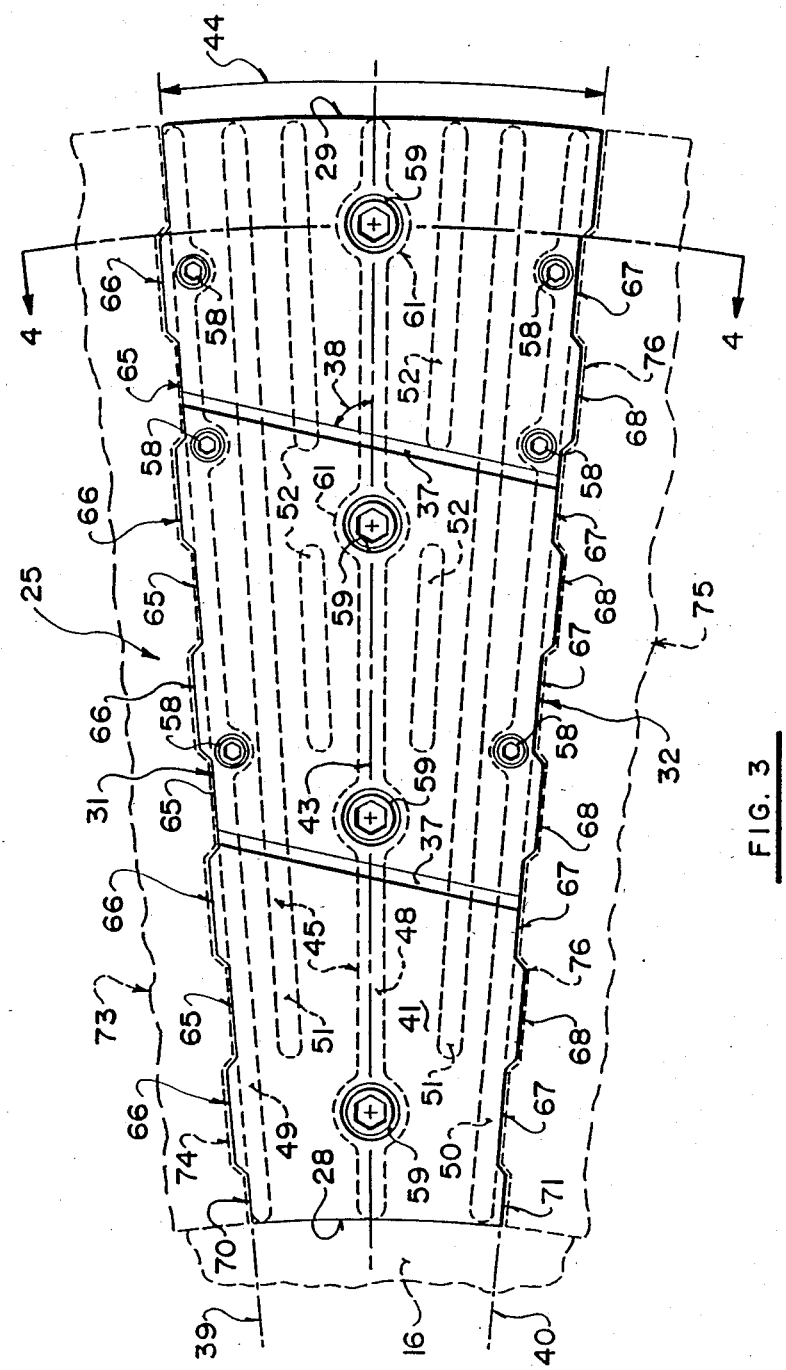
FIG. 3 is a simplified front elevation of a disc segment shown secured to a portion of a main disc member, portions of adjacent disc segments being shown on each side of the disc segment.

A brake disc assembly 10 according to the invention is mounted on a shaft 12 for rotation about a disc axis 14. The brake disc assembly includes a main disc member 16 adapted for rotation about the disc axis 14, and having first and second parallel main surfaces 17 and 18. The shaft 12 is secured, for example by a flange 19, to the disc 16 which thus carries braking torque. The disc member 16 can be a rolled steel disc of high material integrity and strength, in contrast to prior art sand-cast brake discs.

The disc assembly also includes a plurality of disc segments severally 20, which are secured to the main disc member. The disc segments are disposed as first and second sets 21 and 22 respectively which are secured to the first and second main surfaces 17 and 18 of the disc member so that the main disc member is sandwiched between the two sets of disc segments. A specific disc segment 25 of the plurality 20 has arcuate inner and outer edges 28 and 29, and radially disposed, first and second interconnecting edges 31 and 32 which interconnect the inner and outer edges. It is seen that the term "segment" as used herein is not to be construed in the strict geometrical sense, but instead the segment 20 is seen to resemble a truncated sector of a circle. The segments are essentially similar to each other, and thus when a set of segments is assembled and secured to the main surface of the main disc member, the set forms circular, concentric inner and outer edges 34 and 35 of the sets of disc segments.

FIGS. 3 and 4

The disc segment 25 has outer and inner surfaces 41 and 42, the outer surface being flat and disposed parallel to the main surfaces 17 and 18 of the disc, as best seen in FIG. 4.

Preferably, shallow grooves 37 extend across the outer surface 41 and are inclined at an angle 38 to a central radius 43 of the segment. The angle 38 is not a right angle in order that the grooves 37 are not inclined tangentially to the segment to avoid producing complementary ridges in the brake pads. The grooves assist in minimizing distorsion due to thermal gradients across the segment.

The inner surface has a plurality of ridges 45 and grooves 47, the ridges being spaced apart by the grooves. The ridges 45 include elongated first and second ridges 49 and 50 which are generally adjacent and extend the full length of the first and second interconnecting edges 31 and 32 respectively.

The ridges 49 and 50 have outer-edge portions 53 and 54 which contact the main surface 17, the ridges being of equal depth so that the edge portions 53 and 54 are disposed within a plane parallel to the outer surface 41 and parallel to the main surfaces 17 and 18 of the disc. Preferably, similar outer portions of the remaining ridges 45 also contact the main surface 17, so that the grooves 47 cooperate with the main surface 17 to form a plurality of air cooling passages 46 between the disc segment and the disc member. The first and second ridges 49 and 50 are designated as outer ridges, and the remaining ridges 45 can be designated as inner ridges which are positioned between the first and second outer ridges and extend generally radially to define the open-ended radially extending cooling passages 46 within the disc assembly. The inner ridges include an elongated central inner ridge 48 extending along the central radius of the segment, two intermediate inner ridges 51, and four shorter inner ridges 52.

The disc segment 25 has a plurality of parallel clearance openings 58 which are disposed along the first and second interconnecting edges 31 and 32, and similar openings 59 disposed along the central inner ridge 48. The first and second ridges 49 and 50 have relatively short bosses 60 containing the openings 58, the bosses being generally integral with the respective ridges 49 and 50 adjacent the outer surface 41 as shown. The inner ridge 48 has integral bosses 61 containing the clearance openings 59, the bosses being full depth to extend between inner and outer surfaces of the segment. The openings 58 and 59 are counterbored adjacent the outer surface. In effect, the disc segment has a plurality of parallel openings passing between the inner and outer surfaces of the disc segment. The main disc member 16 has a plurality of integrally threaded openings 62 spaced along radii of the disc, the openings 58 and 59 of the disc segment being adapted to register with the openings 62 of the disc. A plurality of screws 63 and 64 pass through the openings 58 and 59 respectively in the disc segments which are clearance openings, and are threaded into openings 62 in the disc member which are in registration with each other, so as to secure the disc segments to the main disc member. The screws 63 in the openings 58 can be smaller than the screws 64 in the openings 59, as shown, thus reducing obstruction of the outer cooling passages through the disc. The openings 58 and 59 are in a particular hole pattern spaced adjacent the interconnecting edges and along a radial centre line of the segment so as to eliminate essentially any warpage of the disc segment due to thermal stresses.

The inner and outer edges 28 and 29 are concave and convex respectively, both edges being concentric with the disc axis 14 of FIGS. 1 and 2 as previously stated. The first and second interconnecting edges are inclined to each other at a sector angle 44 which is subtended at the axis 14 by the outer edge 29 of the disc segment. Thus, when the disc segment is secured to the main disc member, the first and second interconnecting edges are aligned with radii of the disc, and inwardly inclined radial extensions of the first and second interconnecting edges intersect at the disc axis. In FIG. 3, the radii and radial extensions of the edges 31 and 32 coincide and are designated 39 and 40 respectively.

The first interconnecting edge 31 has a plurality of recesses 65 and projections 66 extending therealong and alternating with each other from adjacent the inner edge 28 to the outer edge 29. Similarly, the second interconnecting edge 32 has similar recesses 67 and projections 68 extending therealong. Adjacent the inner edge 28 and on the interconnecting edge 31 there is a half recess 70, and correspondingly on the interconnecting edge 32 there is a half projection 71. The half recess and half projection ensure that the recess and projections of the first interconnecting edge are staggered radially relative to the recesses and projections of the second interconnecting edge. This radial staggering ensures the opposite interconnecting edges of a disc segment are complementary to each other, and is necessary to permit adjacent segments to fit together as follows. An adjacent disc segment 73, shown fragmented in broken outline, has a second interconnecting edge 74, which is essentially indentical to the edge 32 and thus is also complementary to the edge 31. This permits the projections and recesses of the first interconnecting edge 31 of the first disc segment 25 to be engaged by the recesses and projections of the second interconnecting edge 74 of the second disc segment 73. Similarly, a third disc segment 75, shown fragmented in broken outline on an opposite side of the disc segment 25, has a first interconnecting edge 76 which is complementary to the second interconnecting edge 32 of the first disc segment.

To reduce weakening effects of the openings 62 in the main disc member 16, the threaded openings 62 for the segments on one side of the disc are spaced some distance from similar threaded openings for the segments on the other side of the disc. To ensure adequate thread engagement depth, for a relatively thin disc member 16, the screws of one set do not engage a disc opening 62 used by screws of the other set. As seen in FIG. 4, the edges 31 and 32 of the disc segment 25 of the first set 21 are staggered circumferentially by a spacing 80 relative to an edge 78 of a disc 79. The spacing 80 is equal to one half of the chord width of a segment at that particular radial location. Note that openings for the screws 63 along an interconnecting edge of a segment of one set do not coincide with the openings for the screws 59 along the central radius of the other set.

OPERATION

The main disc member 16 is mounted for rotation on the shaft 12 and the first and second sets of segments 21 and 22 are secured by screws 63 and 64 passing through respective openings 58 and 59 in the disc segments aligned with the openings 62 in the disc member. The disc assembly is then machined so as to remove a skim of material from the outer surfaces 41 of the disc segments, so that outer surfaces of the disc segments secured to a particular main face of the disc member are coplanar with each other and form a generally flat braking surface disposed normally to the disc axis. This is to ensure that minor manufacturing and fitting errors are essentially removed so that the braking surface can be swept by a brake shoe or pad without interference between joints between adjacent disc segments. During operation, air is drawn adjacent the center of the disc and passes through the cooling passages to exit through the outer periphery of the disc, similarly to a normal air cooled brake disc. Heat generated during braking is conducted from the outer surfaces of the segments to the inner surfaces thereof, and then to the disc member 16 itself. There is sufficient clearance between the screws 63 and 64 and the clearance openings 58 and 59 to permit the segments to move slightly relative to each other and the disc member 16 to accommodate any deflection of the screws that might occur due to relative movement between the segments and the disc member. This slight movement and the shallow grooves 37 are sufficient to avoid excessive distortion of the disc assembly as a whole due to thermal expansion and contraction. The projections and recesses of the interconnecting edges similarly permit this slight movement to avoid excessive distortion.

ALTERNATIVES

The disc segment is shown with the two outer ridges 49 and 50 adjacent the edges 31 and 32 and a plurality of inner ridges disposed between the central ridge. This provides a plurality of grooves 47 between the ridges but if only two ridges were used, only one groove between the two ridges would result. This is adequate for some applications. If each ridge of the plurality of ridges contacts a respective surface of the disc member, a plurality of passages 46 is formed between the segment and disc member 16. Clearly, the more ridges there are, the more passages are formed and the greater is the surface area for cooling. To ensure a sufficient connection between the disc segment and disc member, a minimum of two ridges should contact the disc member, and preferably these should be the ridges adjacent the interconnecting edges. The inner ridges do not need to contact the disc member surface but this is preferred for improved thermal conductivity from the discs outer surface to the disc member and to enhance strength of the disc assembly.

The brake disc assembly 10 of FIGS. 1 and 2 is provided with two sets of air cooling passages 46 on both sides of the main disc member 16 which removes heat internally from the disc. For enhanced cooling of the braking surfaces, an external fan means can be provided which directs jets of air across the braking surfaces from the center of the disc outwardly, so as to increase air flow across the disc and thus enhance cooling from the outer surface of the disc segment. FIGS. 5 through 9 show alternative disc segments including fan elements which can be cast or fabricated as a single or integral unit with the disc segment, and assembled in the manner as described previously. Alternatively, a separate annular fan element can be cast as a single-piece independent pump unit and then secured adjacent the centre of the disc assembly of the segments 20, but this alternative is not shown.

Figure 5:
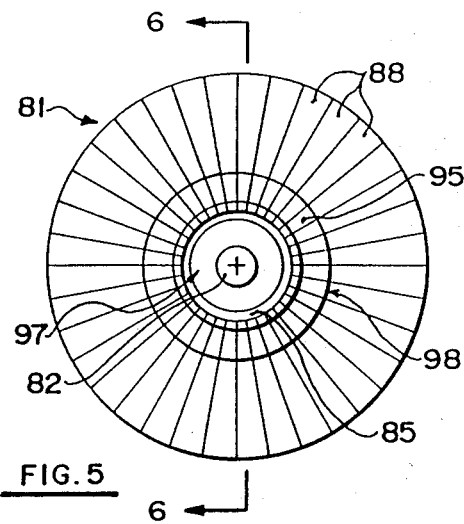
FIG. 5 is a simplified front elevation of an alternative brake disc assembly according to the invention fitted with external fan means.
Figure 6:
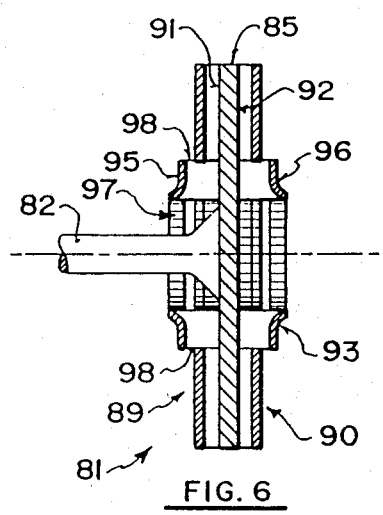
FIG. 6 is a simplified, partially-sectioned, side elevation of the brake disc assembly of FIG. 5 taken along the line 6—6 of FIG. 5.

FIGS. 5 and 6

An alternative disc assembly 81 is mounted for rotation on a shaft 82 and has a main disc member 85, the shaft 82 and disc member 85 being essentially similar to those of FIGS. 1 and 2. Alternative disc segments, severally 88, are secured as first and second sets 89 and 90 to opposite first and second main faces 91 and 92 of the main disc member 86. The first and second sets 89 and 90 have external fan means 95 and 96 respectively which surround the shaft 92 and direct jets of air outwardly across outer surfaces of the sets 89 and 90 respectively of the disc segments. The fan means 95 has annular inlet and discharge openings 97 and 98 which surround the shaft 82, and similar openings are provided for the fan means 96 of the set 90 on the opposite side of the assembly.

Figure 9:
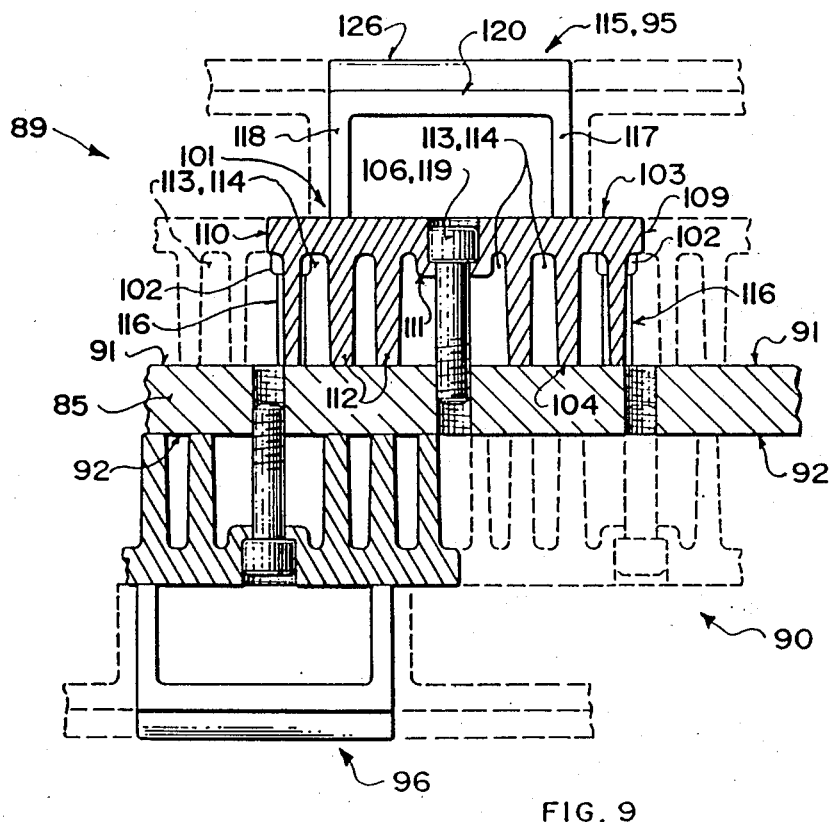
FIG. 9 is a simplified, fragmented section on an arcuate line 9—9 of FIG. 7, looking inwardly towards the disc center, some dimensions being distorted.

FIGS. 7 through 9

A typical alternative disc segment 101 of the segments 88 has outer and inner surfaces 103 and 104, and inner and outer edges 107 and 108 which define inner and outer margins respectively of the surfaces of the disc. The disc element also has first and second interconnecting edges 109 and 110 which interconnect the inner and outer edges to define the shape of the disc segment. In contrast with the segment 20 of FIGS. 1 through 4 the edges 109 and 110 are not provided with recesses and projections, but instead are straight, so that all interconnecting edges are similar to each other. The outer surface 103 is flat and disposed parallel to the main surfaces of the disc member, and the inner surface 104 has a plurality of ridges and grooves 112 and 113 respectively to form air cooling passages 114 which are generally similar to those previously described with reference to FIGS. 3 and 4, with main differences as described below.

The segment 101 has a plurality of spaced parallel clearance openings 105 extending along and generally adjacent the interconnecting edges 109 and 110, and a plurality of spaced parallel clearance openings 106 extending along a central radius of the segment. The openings 105 and 106 pass through respective relatively short bosses 102 and 111 respectively, and receive screws 116 and 119 respectively to secure the segment to the disc member. The relatively short bosses minimally obstruct air flow through the passages 114. In contrast with the segment 20 of FIGS. 1 through 4, some of the ridges are intersected by the screws which pass clearly through clearance gaps in the ridges, and the full depth bosses 61 of FIGS. 3 and 4 containing the screws are eliminated. A central inner ridge 121 is divided into five aligned ridge portions 127 by four screws 119. Similarly a typical outer ridge 128 adjacent the edge 110 is divided into a plurality of aligned ridge portions by five screws 116. Shanks of the screws 116 and 119 are aligned with the ridge portions to reduce air obstruction, and spaces on opposite sides of the shanks separate the screws from the ridge portions, thus permitting movement of the segments relative to the screws and accommodating any deflection of the screws.

An external fan element 115 is provided adjacent a portion of the disc segment closest to the disc axis, not shown, and is adapted to cooperate with similar fan elements of the plurality of disc segments to provide the external fan means 95 as described previously. The fan element includes first and second fan side walls 117 and 118 which are circumferentially spaced apart and radially extending as inward extensions of the interconnecting edges 109 and 110. The side walls 117 and 118 also extend outwardly axially from the main disc member to a position spaced outwardly axially from the outer surface 103 of the disc segment. The fan element also includes a fan interconnecting wall 120 which extends between the two spaced fan side walls and is spaced axially distances 122 and 123 from the outer surface 103 of the brake segment and the main surface 91 respectively. It can be seen that the interconnecting wall 120, the two fan side walls 117 and 118 and a portion of the outer surface 103 of the brake segment define an elemental discharge opening 124, which is a portion of the annular discharge opening 98. The discharge opening is adapted to direct a jet of air, shown as arrow 125, across the outer surface 103 of the brake segment as the assembly rotates. The fan interconnecting wall 120 has an outwardly flared portion 126 which diverges axially outwardly from the main surface of the main disc member, as best seen in FIG. 8. Preferably, the outwardly flared portion is generally concentric with the shaft axis, so that when the plurality of disc segments are secured to the main disc member, the generally annular inlet opening 97 is generated, as shown partially in FIGS. 5, 6 and 7. It can be seen that the assembly of external fan elements functions as a centrifugal pump so that air entering the opening 97 passes between the walls 117, 118 and 120 and the surface 103 to discharge partially through the discharge opening 124 as the arrow 125, and partially to pass along the generally radial air cooling passages 114 within the disc segment as an arrow 130. The external fan element is particularly advantageous in large brake discs adapted to absorb large amounts of horsepower, so as to improve cooling from both surfaces of the disc segments.

While the alternative segment 101 is shown with alternative straight interconnecting edges and alternative ridges intersected by screws at clearance gaps between aligned ridge portions, the segment 20 could be provided with similar alternative straight interconnecting edges and aligned ridge portions. Similarly, the segment 101 could have interconnecting edges provided with recesses and projections and continuous ridges containing full depth bosses to receive the screws.

I claim:

1. Brake disc assembly, comprising:
   (a) a main disc member rotatable on an axis and including first and second main surfaces disposed normal to said axis;
   (b) a plurality of adjacently disposed complementary segments, each segment shaped as a truncated sector of a circle and each segment including an outer surface and an inner surface and a plurality of radially disposed ridge means extending from said inner surface for defining a plurality of grooves;
   (c) a plurality of means extending parallel to said axis through each segment for releasably and removably securing each segment to one of said main surfaces so that each ridge means seats on the associated main surface and said grooves thereby form radially extending cooling channels and further so that each segment may move relative to the adjacent segments and to said disc member for causing thermally induced distortion to be reduced when said segments are frictionally engaged by a brake pad means;
   (d) at least some of said ridge means include a plurality of radially aligned and spaced ridges; and,
   (e) each of said securing means is disposed between a radially aligned and spaced two of said ridges.

2. The assembly of claim 1, wherein:
   (a) a plurality of second spaced parallel grooves are disposed in said outer surface, said second grooves are disposed non-tangentially to the circumference of the associated segment.

3. The assembly of claim 1, wherein said securing means includes:
   (a) a plurality of first and second securement elements;
   (b) said first securement elements operably associated with first and second radially peripheral ridge means, and each of said first and second ridge means being adjacent a marginal edge of the associate segment;
   (c) said second securement elements operably associated with a third centrally disposed ridge means; and,
   (d) the diameter of said second securement elements exceeding the diameter of said first securement elements.

4. The assembly of claim 3, wherein:
   (a) the first and second securement elements for each segment secured to one of said main surfaces are offset relative to the first and second securement elements for each segment secured to the other one of said main surfaces.

5. The assembly of claim 1, wherein:
   (a) the securing means securing each segment to one of said main surfaces are offset relative to the securing means securing each segment to the other one of said main surfaces.

6. The assembly of claim 5, wherein:
(a) a plurality of openings extend axially through said disk member; and,
(b) each of said securing means has a portion thereof secured within one of said openings.

7. The assembly of claim 6, wherein:
(a) each of said openings is threaded; and,
(b) each of said securing means includes a screw means having a threaded portion secured within the associated threaded opening.

8. The assembly of claim 1, wherein each segment includes:
(a) first and second radially disposed marginal edge portions;
(b) the first edge portion of each segment disposed adjacent the second edge portion of each adjacent segment; and,
(c) each of said first and second edge portions including means for aligning the associated segment relative to the adjacent segments.

9. The assembly of claim 8, wherein:
(a) said aligning means includes a plurality of alternating recesses and projections associated with each of said first and second edge portions.

10. The assembly of claim 9, wherein:
(a) the recesses of one edge portion are aligned with the projections of the other edge portion.

11. The assembly of claim 1, further comprising:
(a) fan means operatively associated with each of said main surfaces and rotatable therewith for forcing cooling air through each of the associated cooling channels.

12. A brake disc assembly for high horsepower loads, comprising:
(a) a steel main disc member rotatable on an axis and including first and second parallel surfaces disposed normal to said axis, said member having a diameter of no less than 0.5 meters;
(b) a plurality of adjacently disposed complementary cast braking segments, each segment shaped in plan as a truncated sector of a circle and each segment including an outer braking surface having a plurality of spaced parallel first grooves disposed non-tangentially to the segment circumferences and further including a plurality of radially disposed ridge means extending from an inner surface thereof for defining a plurality of second grooves;
(c) a plurality of means extend parallel to said axis through each segment for releasably and movably securing each segment to one of said first and second surfaces so that each ridge means seats on the associated member surface and said second grooves thereby form radially extending cooling channels and further so that each segment may move along the associated member surface relative to the adjacent segments and thereby reduce distortion caused by thermally induced expansion and contraction as braking means engage said braking surfaces;
(d) at least some of said ridge means include a plurality of radially extending and spaced ridges; and,
(e) each of said securing means extending between a radially associated and spaced two of said ridges.

13. The assembly of claim 12, wherein:
(a) the securing means securing the segments to one of said first and second surfaces are non-coincident with the securing means securing the segments to the other one of said first and second surfaces.

14. The assembly of claim 12, further comprising:
(a) fan means operably associated with each of said first and second surfaces and rotatable therewith for forcing cooling air through the associate channels.

15. The assembly of claim 12, wherein:
(a) each segment includes first and second marginal edge portions; and,
(b) aligning means are operably associated with each of said edge portions for aligning each segment relative to the adjacently disposed segments and said aligning means include a plurality of recesses and projections disposed in alternating sequence with the projections of one edge portion aligned with the recesses of the other edge portion.

16. A braking element for being mounted to a rotatable main member of a disc brake assembly, comprising:
(a) a cast braking segment which, in plan, is a truncated sector of a circle and includes first and second radially extending edge portions interconnected by an inner concave edge portion and an outer convex edge portion;
(b) a flat outer interrupted braking surface extending between said first and second edge portions and said inner and outer portions for being disposed normal to the axis of rotation of a rotor assembly to which said segment is to be mounted;
(c) a plurality of first grooves interrupting said braking surface, said first grooves being oriented non-tangentially to said outer convex portion;
(d) a plurality of spaced radially extending ridge means extending from an inner surface of said segment for defining a plurality of second grooves which cooperate with the rotor assembly when said segment is mounted thereto for forming a plurality of cooling channels;
(e) a plurality of first openings extending through said segment generally perpendicular to said braking surface for receiving securing means which movably secure said segment to the rotor assembly;
(f) at least some of said ridge means include a plurality of radially extending and spaced ridges; and,
(g) each of said openings extending between a radially associated and spaced two of said ridges.

17. The segment of claim 16, wherein at least some of said ridge means terminating on a common plane.

* * * * *